(12) United States Patent
Waugh (10) Patent No.: US 10,198,360 B2
(45) Date of Patent: Feb. 5, 2019

(54) SYSTEMS AND METHODS STORING A PAGE FAULT VIRTUAL ADDRESS TO PREVENT UNNECESSARY PAGE TABLE WALKS

(71) Applicant: ARM LIMITED, Cambridge (GB)

(72) Inventor: Alex James Waugh, Cambridge (GB)

(73) Assignee: ARM Limited, Cambridge (GB)

( * ) Notice: Subject to any disclaimer, the term of this patent is extended or adjusted under 35 U.S.C. 154(b) by 0 days.

(21) Appl. No.: 14/867,454

(22) Filed: Sep. 28, 2015

(65) Prior Publication Data

US 2017/0091113 A1 Mar. 30, 2017

(51) Int. Cl.
*G06F 12/00* (2006.01)
*G06F 12/1009* (2016.01)
*G06F 12/1027* (2016.01)
*G06F 11/07* (2006.01)

(52) U.S. Cl.
CPC ........ *G06F 12/1009* (2013.01); *G06F 11/073* (2013.01); *G06F 11/0793* (2013.01); *G06F 12/1027* (2013.01); *G06F 2212/1032* (2013.01); *G06F 2212/68* (2013.01)

(58) Field of Classification Search
CPC ............. G06F 12/1009; G06F 12/1027; G06F 2212/68; G06F 2212/1032
USPC .................................................. 711/202–207
See application file for complete search history.

(56) References Cited

U.S. PATENT DOCUMENTS

| | | | | |
|---|---|---|---|---|
| 6,560,664 B1 * | 5/2003 | Carlson | ................... | G06F 12/10 710/113 |
| 2003/0126371 A1 * | 7/2003 | Venkatraman | ........ | G06F 9/3842 711/137 |
| 2004/0024729 A1 * | 2/2004 | Worley | ............... | G06F 12/1027 |
| 2006/0026385 A1 * | 2/2006 | Dinechin | ............ | G06F 12/1036 711/210 |
| 2010/0223447 A1 * | 9/2010 | Serebrin | ............. | G06F 12/0253 712/225 |
| 2013/0227245 A1 * | 8/2013 | Gupta | ................. | G06F 12/1027 711/205 |

* cited by examiner

*Primary Examiner* — Tuan V Thai
*Assistant Examiner* — Tasnima Matin
(74) *Attorney, Agent, or Firm* — Nixon & Vanderhye P.C.

(57) ABSTRACT

There is provided a data processing apparatus comprising: processing circuitry to speculatively execute an instruction referencing a virtual address. Lookup circuitry receives the virtual address from the processing circuitry. The lookup circuitry comprises storage circuitry to store at least one virtual address and page walking circuitry to perform a page walk on further storage circuitry, in dependence on the virtual address being unlisted by the storage circuitry, to determine whether a correspondence between a physical address and the virtual address exists. The lookup circuitry signals an error when the correspondence cannot be found and, in response to the error being signaled, the storage circuitry stores an entry comprising the virtual address.

16 Claims, 4 Drawing Sheets

Figure 1

```
#1   loop:   ADDS r0, r0, r1
#2           BEQ loop
#3           LDR r2, [r10]
```

Figure 2A

```
#1   loop:   ADDS r2, r3, r4
#2           LDREQ r5, [r11]
#3           B loop
```

SYSTEMS AND METHODS STORING A PAGE FAULT VIRTUAL ADDRESS TO PREVENT UNNECESSARY PAGE TABLE WALKS

The present technique relates to the field of data processing, particularly the translation between virtual and physical addresses.

A Translation Lookaside Buffer (TLB) can be used to provide a translation between a physical address and a virtual address. When such a translation cannot be found (a miss), it is necessary to carry out the comparatively long process of performing a page walk. This involves looking up the page table in main memory. If a translation is found, then it is subsequently stored in the TLB for later access. If no translation is found, then in some architectures, a translation fault is raised and nothing is stored in the TLB.

In some processing circuits, speculative execution is used to begin execution of an instruction before it is known whether or not that instruction ought to be executed. For example, the instructions following a conditional branch instruction could be executed before it is known what the result of the conditional branch instruction is. It is generally anticipated that, most of the time, such speculative execution will be correct, thereby enabling the processing circuit to operate more efficiently than if it simply waited for the branch instruction to be resolved before executing the following instructions. If it is subsequently determined that the instructions began execution erroneously, then the process of executing those instructions can be terminated and the state of the processing circuit can be effectively "rewound".

If an instruction that causes a faulting translation is repeatedly speculatively executed, but always rewound, then a page walk will be started each time the instruction is executed. This can be wasteful of processing resources.

Viewed from a first example configuration, there is provided a data processing apparatus comprising: processing circuitry to speculatively execute an instruction referencing a virtual address; lookup circuitry to receive the virtual address from the processing circuitry, the lookup circuitry comprising: storage circuitry to store at least one virtual address; and page walking circuitry to perform a page walk on further storage circuitry, in dependence on the al address being unlisted by the storage circuitry, to determine whether a correspondence between a physical address and the virtual address exists, wherein the lookup circuitry signals an error when the correspondence cannot be found; and in response to the error being signaled, the storage circuitry stores an entry comprising the virtual address.

Viewed from a second example configuration, there is provided a method of operating a data processing apparatus, the method comprising the steps: speculatively executing an instruction referencing a virtual address; checking a storage circuitry for the virtual address; performing a page walk on further storage circuitry, in dependence on the virtual address being unlisted by the storage circuitry, to determine whether a correspondence between a physical address and the virtual address exists, wherein an error is signaled when the correspondence cannot be found; and in response to the error being signaled, the storage circuitry stores an entry comprising the virtual address.

Viewed from a third example configuration a data processing apparatus, comprising: means for speculatively executing an instruction referencing a virtual address; means for checking a storage means to determine whether the virtual address is listed; means for performing a page walk on further storage circuitry, in dependence on the virtual address being unlisted by the storage circuitry, to determine whether a correspondence between a physical address and the virtual address exists, wherein an error is signaled when the correspondence cannot be found; and in response to the error being signaled, the storage means stores an entry comprising the virtual address.

The present technique will be described further, by way of example only, with reference to embodiments thereof as illustrated in the accompanying drawings, in which.

Before discussing the embodiments with reference to the accompanying figures, the following description of embodiments and associated advantages is provided.

Viewed from a first example configuration, there is provided a data processing apparatus comprising: processing circuitry to speculatively execute an instruction referencing a virtual address; lookup circuitry to receive the virtual address from the processing circuitry, the lookup circuitry comprising: storage circuitry to store at least one virtual address; and page walking circuitry to perform a page walk on further storage circuitry, in dependence on the virtual address being unlisted by the storage circuitry, to determine whether a correspondence between a physical address and the virtual address exists, wherein the lookup circuitry signals an error when the correspondence cannot be found; and in response to the error being signaled, the storage circuitry stores an entry comprising the virtual address.

A page walk occurs as a consequence of the storage circuitry not having an entry in relation to a virtual address that is referenced in a speculatively executed instruction. The page walk, which may be time consuming as compared to the process of accessing the storage circuitry, is used to determine the corresponding physical address for the virtual address. If no correspondence can be found, then an error is signaled. In response to this error, the storage circuitry then stores an entry comprising the virtual address. Accordingly, in the future, if the same instruction is speculatively executed again, the page walk process will not take place, thereby saving resources. The virtual instruction can reference a virtual address by, for example, referring directly to the virtual address, referring to a register containing the virtual address, or the instruction could be one in which the virtual address or location of the virtual address is implicit.

In some embodiments, in response to the correspondence being found by the page walking circuitry, the storage circuitry stores an entry comprising the virtual address and the physical address; and in response to the lookup circuitry receiving the virtual address when the storage circuitry comprises an entry comprising the virtual address and the physical address, the lookup circuitry provides the physical address to the processing circuitry. Accordingly, an entry comprising the correspondence is also stored in the storage circuitry if the correspondence is found by searching the storage circuitry. Hence, for a known correspondence between a virtual address and a physical address, a page walk can also be prevented.

In some embodiments, in response to the error being signaled, the storage circuitry stores an entry comprising the virtual address and a fault indication to indicate the entry was made in response to the error being signaled. Accordingly, entries in the storage circuitry that were made as a consequence of the error being signaled are marked accordingly. Such fault indications indicate that the entry in the storage circuitry does not contain a translation between a virtual address and a physical address, but rather, that it refers to a virtual address that previously produced a translation error. Such an indication can be used to prevent erroneous accesses into physical memory.

In some embodiments, the processing circuitry issues a speculation signal to the control circuitry to indicate whether or not the instruction was correctly speculatively executed. After speculatively executing an instruction, for example, at a conditional branch instruction, it will be possible to determine whether or not that instruction was correctly speculatively executed for example, whether or not it was correctly predicted which branch the conditional branch instruction would take. Once this has been determined, a signal is issued to the control circuitry, the value of the signal depends on whether the instruction was correctly executed or whether a "rewind" should take place.

In some embodiments, in response to the speculation signal indicating that the instruction was correctly speculatively executed and the storage circuitry having an entry comprising the virtual address and the fault indication, the entry is removed from the storage circuitry and the page walk circuitry performs the page walk again; and the lookup circuitry signals a further translation error to the processing circuitry when the correspondence cannot be found again. If the translation originally caused a fault, and the instruction that caused the translation to occur was correctly speculatively executed then a further page walk is executed. This is because, in the interim, it is possible that the translation error has been repaired and that in carrying out the page walk, the correct translation can be determined. However, in the event that the correct translation cannot be determined again, a further translation error is signaled. This could be signaled to the processing circuitry, for example, in order to cause management software to intervene—for example, by raising an exception or by terminating software that is causing the translation error to occur.

In some embodiments, in response to the lookup circuitry signaling the further translation error, the storage circuitry adds an entry comprising the virtual address and the fault indication. This can prevent multiple instructions that are close to each other (e.g. back to back), that reference the same virtual instruction from causing multiple page walks.

In some embodiments, in response to the speculation signal indicating that the instruction was incorrectly speculatively executed, the page walk is allowed to complete before the instruction is rewound; and in response to the error being signaled, the storage circuitry stores an entry comprising the virtual address. By allowing the page walk to complete, even if the instruction is to be rewound, the result of the page walk can be determined and stored in the storage circuitry, regardless of its outcome. If the page walk were only partially performed, then it would be possible that nothing would ever be stored in the storage circuitry, causing the page walk to repeatedly be performed partially, which would be wasteful of resources. By allowing the page walk to continue, even if the instruction is subsequently rewound, the result of the page walk (whether it causes an error or not) can be stored in the storage circuitry. The entry that is stored to the storage circuitry is kept, regardless of the rewind, such that the result can be used in the future.

In other embodiments, in response to the speculation signal indicating that the instruction was incorrectly speculatively executed, the page walk is terminated. Such embodiments seek to reduce the losses experienced as a consequence of incorrectly speculatively executing an instruction. If the signal indicates that the instruction should not have been executed, then resources that are being expended in performing the page walk are freed up so that they can be expended on something else.

In some embodiments, the lookup circuitry comprises a translation lookaside buffer. A Translation Lookaside Buffer (TLB) is used as a buffer to quickly translate between virtual addresses and physical addresses.

In some embodiments, the further storage circuitry is a memory device. For example, the further storage circuitry, which contains a list of translations or correspondences between physical and virtual addresses that cannot be stored in the storage circuitry, could be a main memory.

In some embodiments, the entry comprises one or more attributes. The attributes could indicate, for example, whether or not a particular entry in the storage circuitry is valid. The attributes may also indicate the last time that a particular entry was accessed. Such information can be useful to ensure that the entries stored in the storage circuitry are limited to those entries that are most likely to be of use in the near future. The attributes could also include, for example, access protection information, to indicate the extent to which different processes can access the requested memory location. For example, certain processes could only be permitted to read memory at certain memory locations. In other cases, a process could even be refused the right to read memory at a particular location. Such conditions can be stored as part of the attributes.

Particular embodiments will be described with reference to the figures.

Figure 1:
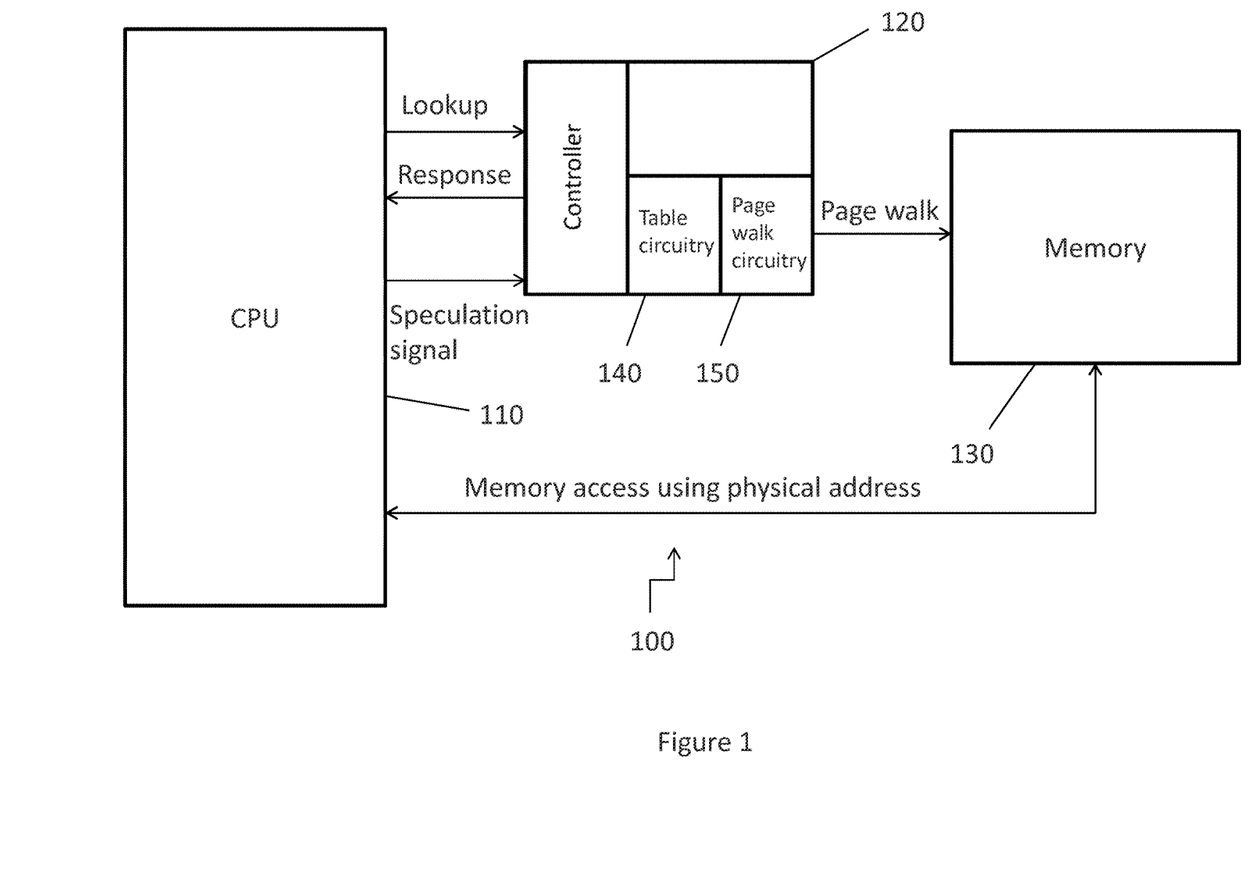
FIG. 1 schematically illustrates a data processing apparatus in accordance with one embodiment.

FIG. 1 illustrates a data processing apparatus 100 in accordance with one embodiment. Within the data processing apparatus, a Central Processing Unit (CPU) is provided, which is capable of speculative execution. The CPU is an example of processing circuitry. Speculative execution allows execution of an instruction to begin before it is confirmed whether or not that instruction should be executed. For example, in a stream of instructions having a branch instruction followed by one or more further instructions, the further instructions could be executed prior to the outcome of the branch instruction being known. This technique can allow the efficient use of processing resources, since it can remove the need for processing to pause while the outcome of the branch instruction is determined before further processing continues. If it is determined that the further instructions were correctly executed then processing resources have not been unnecessarily expended. If it is determined that the further instructions were incorrectly executed then the partial results of starting the execution of those instructions can be deleted and execution can resume from the correct point. In this case, there is little (if any) loss as compared to the situation of waiting for the branch instruction to complete before continuing execution. Consequently, overall, it can be expected that resources will be saved. Once the CPU has determined whether a particular instruction has been executed correctly or not, an appropriate signal is raised in order to allow a "rewind" to take place in the event that an instruction was incorrectly executed or to allow the speculatively executed instructions to be "committed" if they were correctly executed.

Also in the data processing apparatus is a Translation Lookaside Buffer (TLB) 120, which is an example of lookup circuitry. The TLB 120 provides translations between virtual addresses, which are used by software, into physical addresses, which correspond to physical hardware. In this embodiment, for example, the physical addresses correspond with the addresses of hardware (e.g. rows within memory banks) within a main memory 130. The use of virtual addresses (virtual memory) allows, among other things, for memory belonging to different software processes to be isolated from each other, or for the main memory 130 to be treated as being larger than it actually is. The TLB 120 maintains a cache of recently used translations, and this can be accessed via table circuitry 140, which is an example of storage circuitry. However, not all translations can be stored in the TLB 120 itself. Where a translation is not present within the TLB 120 (i.e. when there is a miss on the TLB), the TLB makes use of page walk circuitry 150 in perform a page walk. This involves accessing the page tables (the full list of translations between virtual and physical addresses) from the memory 130, which is an example of the further storage circuitry. Note that it is common, but by no means necessary, that the further storage circuitry is also the device to which the physical addresses refer. The TLB comprises a controller that enables interaction with the CPU 110—for example, the controller makes it possible for the CPU 110 to issue lookup requests for particular virtual addresses and for the TLB to return physical addresses corresponding to the virtual addresses to the CPU 110.

If the page walk is successful, the translation or correspondence between the virtual address and physical address will be stored by the table circuitry 140. Consequently, next time the translation is needed, there will be a hit on the TLB, allowing the physical address to be determined much more quickly than can be achieved when a page walk must be performed. However the physical address is determined, this is returned to the CPU 110, which can then access memory 130 using the physical address. If the page walk is unsuccessful, for example if no translation or correspondence can be found for a given virtual address, then an error is raised. In the given example, a translation error is raised. This can be signaled to the CPU 110 in order to take some action. The action that can be taken will be dependent on the operating system as well as any underlying architectural requirements.

In the embodiment shown in FIG. 1, when a translation error is raised for a virtual address, a special entry for that virtual address is stored by the table circuitry 140. Accordingly, subsequent attempts to access the same virtual address will hit in the TLB, thereby preventing a page walk from repeatedly occurring. Such repeated execution is likely to occur where an instruction is continually miss-predicted, i.e. if the speculative execution repeatedly incorrectly executes an instruction that references a virtual address that causes a translation error. In the event that the instruction is miss-predicted, then nothing architecturally has happened beyond adding the new entry to the table circuitry 140 and no processing resources have been expended in performing unnecessary page walks. In the event that the instruction is correctly predicted, the data processing apparatus 100 determines that the hit for the virtual address has occurred on the special entry of the TLB. This causes that entry of the TLB to be invalidated and a page walk will occur as if the hit had never occurred in the first place. If the page walk still returns a translation error, then this is returned to the CPU 110 as normal. Architecturally, therefore, in either event, it is as if the special entry made by the table circuitry 140 had never been made.

Figure 2A:
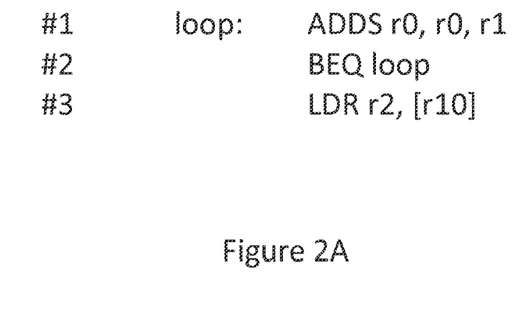
FIGS. 2A-2B illustrate an example of a stream of instructions that can result in speculative execution.

FIG. 2A illustrates a first example of assembly code that results in speculative execution. Line 1 defines the start of a loop, in which the contents of registers r0 and r1 are added together and stored in register r0. In addition, if the result is zero, then a special flag Z is set. At line 2, it is determined whether Z is set and, if so, the flow returns to 'loop' on line 1. Otherwise, on line 3, the contents of memory that are stored at the virtual address stored in register r10 are loaded and stored in register r2. In this example, every time the BEQ instruction is executed on line 2, the CPU 110 performs speculative execution by predicting whether the program will flow to line 1 or line 3. Making such a prediction allows the CPU 110 to continue processing without having to wait for the result of the branch instruction on line 2 to be known. In this example, it is assumed that the CPU 110 continually miss-predicts and therefore begins execution of the instruction on line 3. This causes a memory access to occur, and required the physical address corresponding to the virtual address stored in register r10 to be looked up. If this requires a page walk and if the subsequent page walk causes a translation error (there is no known physical address corresponding to the virtual address) then a special faulting entry will be stored by the table circuitry 140 and the program can continue to speculatively execute. Accordingly, next time the miss-prediction occurs, there will be a hit on the TLB 120 and no page walk will occur—preserving resources. In each case, it will be determined that the instruction was miss-predicted and so the execution of the instruction is "rewound". In other words, the fact that a proper page walk did not occur each time can be disregarded. However, at some point, the prediction will be correct. In this case, the page walk will not have been correctly performed, because it was inhibited by the pseudo hit on the TLB 120. Accordingly, the special faulting entry in the table circuitry 140 is invalidated and a page walk occurs. If, at this point, there is a translation fault, the translation fault is signaled to the CPU 110.

Figure 2B:
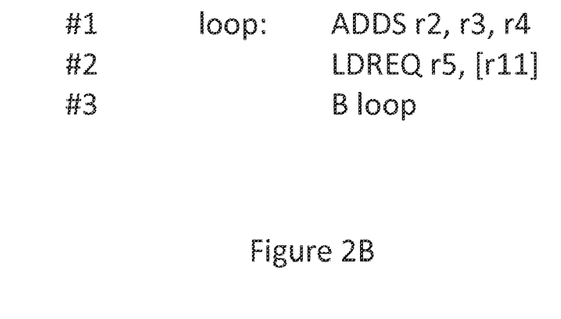

FIG. 2B illustrates a second example of assembly code that results in speculative execution. Line 1 again defines the start of a loop in which the contents of registers r3 and r4 are added together and the result is placed register r2. In addition, if the result of the addition is zero, then a special flag Z is set. At line 2, if the special flag Z is set then the contents of the memory address stored in register r11 are stored in register r5 and otherwise, no action is taken. Finally, at line 3, the program returns to the start of the loop at line 1. In this case, therefore, a memory load operation is performed in dependence on whether the Z flag is set or not. However, whether or not the Z flag is set is dependent on the previous instruction on line 1. Accordingly, the instruction on line 2 is speculatively executed. Again, in this example, the virtual address stored in register r11 causes a translation error to be raised. Hence, rather than repeatedly performing a page walk, which would be wasteful of resources, the first page walk causes the virtual address to be stored as a (special) faulting entry in the table circuitry 140 of the TLB 120 so that future requests to that virtual address will not cause further page walks to occur. In the event that it is determined that the instruction has been correctly speculatively executed, it will be determined that the entry in the TLB 120 is marked as faulting and consequently a further page walk will occur.

Figure 3A:
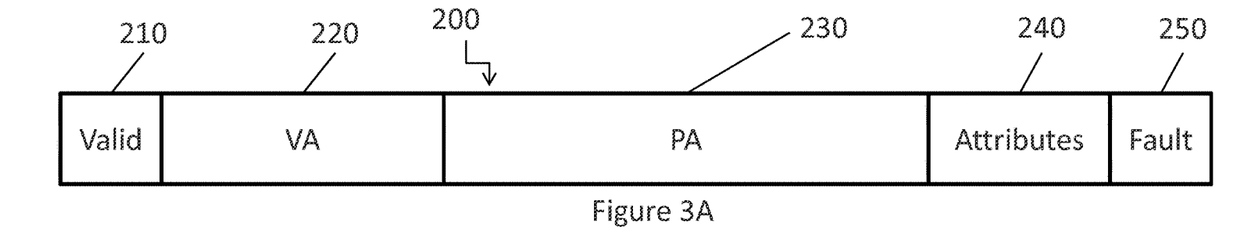
FIGS. 3A-3D illustrate examples of entries in a Translation Lookaside Buffer in accordance with one embodiment.

FIG. 3A illustrates the format of an entry 200 that is stored by the table circuitry 140 of the TLB 120. The format includes a valid bit 210, that indicates whether the particular entry is valid. In the present embodiments, a valid entry is marked by a '1' while an invalid entry is marked with a '0'. A hit can only occur on a valid entry and an invalid entry can be overwritten. Each entry 200 also includes all or part of a virtual address 220 and all or part of a corresponding physical address 230. Note that it is not necessary for the entirety of either the virtual address or physical address to be included in order for a translation to be determined. A set of attributes 240 is also included. These include access permissions related to the virtual address—for example, to indicate that a particular process can write or read to the virtual address. The attributes 240 also include information relating to the last time that the entry was accessed so that only recently accessed entries are kept valid. Finally, a fault flag 250 indicates whether the entry was made as the result of a translation error or not. A faulting entry is marked by a '1' whilst a non-faulting entry is marked as a '0'.

Figure 3B:
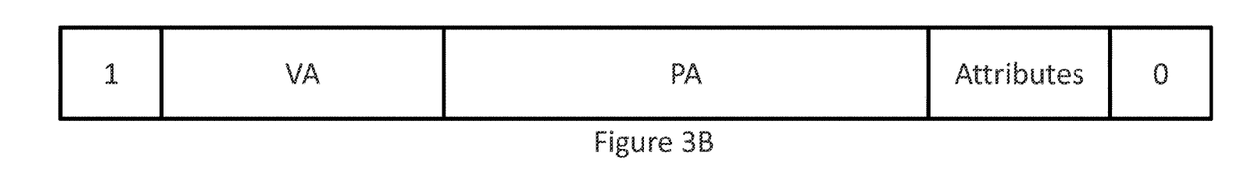

FIG. 3B illustrates the format of a typical valid entry in the TLB 120. The entry is valid, as marked by a '1' in the valid flag. The entry also includes a portion of a virtual address and a corresponding portion of a physical address, together with a set of attributes. Since the entry merely provides a translation between virtual and physical addresses, and is not provided as a consequence of a translation fault, the fault bit is set as '0'.

Figure 3C:
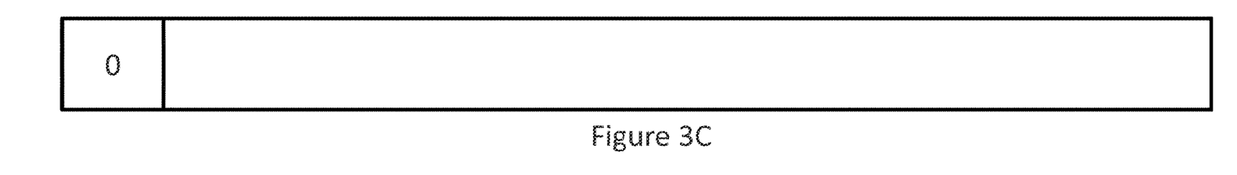

FIG. 3C illustrates the format of an invalid entry in the TLB 120. The entry has a valid flag of '0', indicating that the entry is invalid. Any other bits in the particular entry are disregarded, since the particular entry is invalid.

Figure 3D:
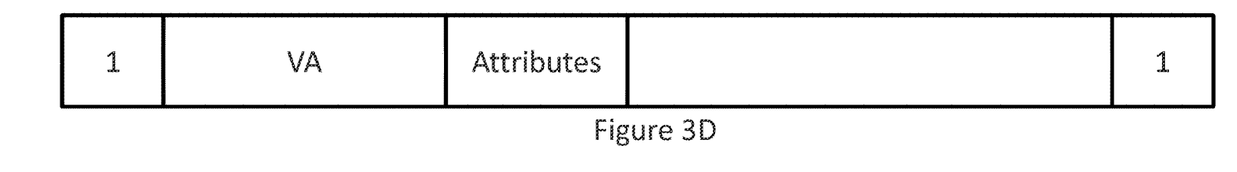

FIG. 3D illustrates the format of a valid faulting entry in the TLB 120. The entry is marked as valid, since the valid flag has a value of '1'. Accordingly, a hit on this entry is possible. The entry also includes a portion of a virtual address. Unlike with the typical valid entry shown in FIG. 3B there is no corresponding physical address. This is because no corresponding physical address could be determined by the page walk (hence a translation error occurred). Accordingly, the remainder of the entry merely contains the attributes associated with the entry and a '1' for the fault bit, to indicate that this particular entry is a faulting entry. The value of the faulting bit makes it possible to determine how to interpret the remaining bits in the entry. For example, the fact that the fault bit has a value of '1' means that it can be determined that attributes follow the virtual address portion, rather than a physical address.

Figure 4:
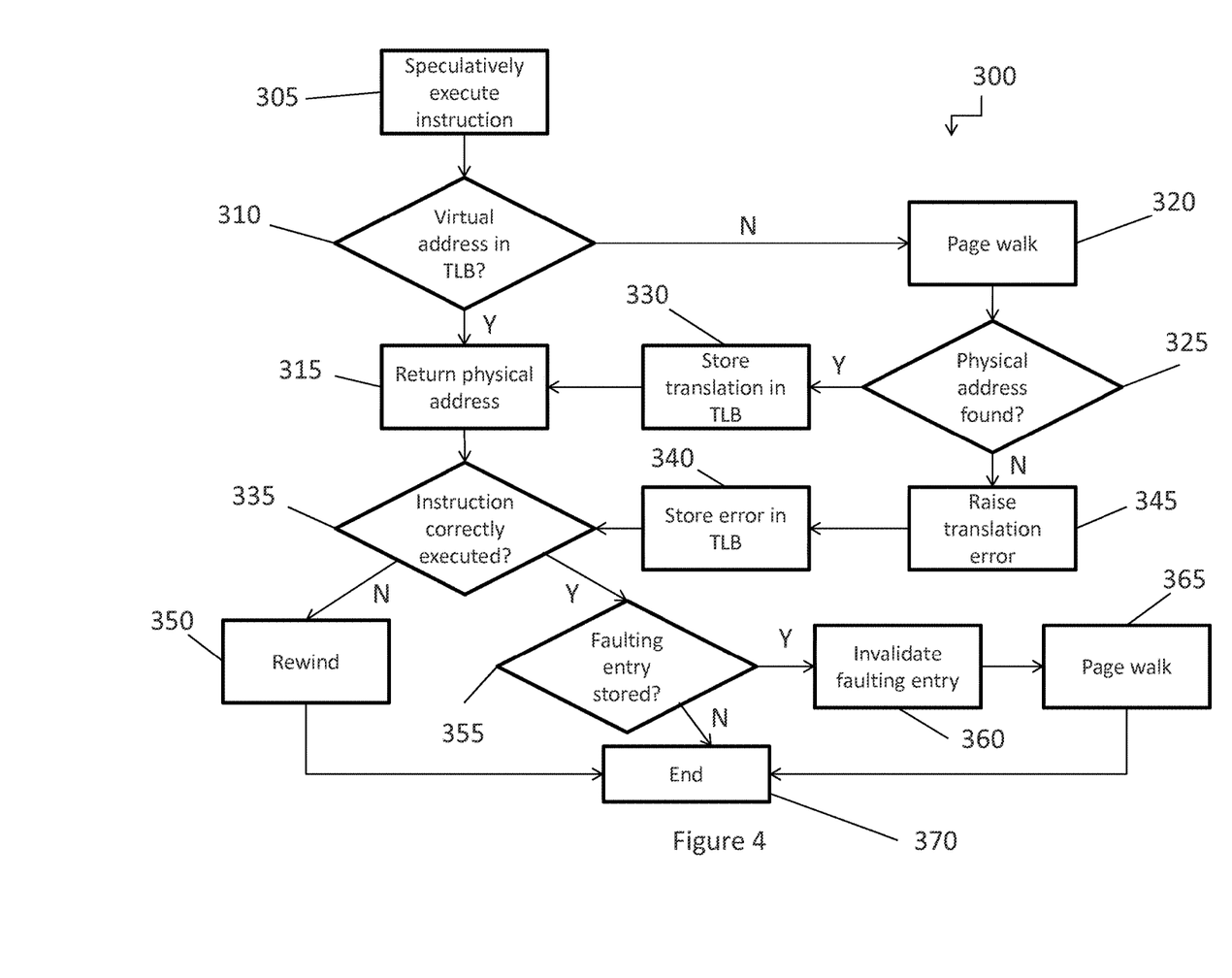
FIG. 4 shows a flow chart illustrating a method of operating a data processing apparatus in accordance with one embodiment.

FIG. 4 shows a flow chart 300 that illustrates a method of operating a data processing apparatus 100 in accordance with one embodiment. The flow starts at step 305 in which an instruction is speculatively executed, which references a virtual address. At step 310, it is determined whether or not the virtual address is in the TLB 120. In other words, it is determined whether or not there is a hit for the virtual address in the TLB 120. If so, then the method proceeds to step 315 where the physical address is returned. If not, then the method proceeds to step 320 where a page walk occurs. At step 325, it is determined whether or not the physical address corresponding to the virtual address is found as a result of the page walk process. If so, then at step 330, the translation is stored in the TLB. In this embodiment, the entry corresponds with the entry illustrated in FIG. 3B. The process then proceeds to step 315 where the physical address is returned. Regardless of how the physical address is returned, the flow proceeds to step 335 where it is determined whether or not the speculatively executed instruction was correctly speculatively executed or not. This is determined by the value of a speculation signal issued by the CPU 110 to the TLB 120. If at step 325, the physical address was not found during the page walk process then a translation error is raised at step 345. Subsequently, a faulting entry is stored in the TLB at step 340. The faulting entry, in this embodiment, corresponds with the entry illustrated in FIG. 3D. The process then proceeds to step 335, where it is determined whether or not the instruction was correctly speculatively executed. If not, then at step 350, a "rewind" takes place. During this step, if the page walk is still being carried out by the page walk circuitry 150, it is terminated. However, in other embodiments, the page walk process will be allowed to complete, with any entries to the TLB 120 being kept despite the rewind taking place. The process then ends at step 370. This corresponds with the case in which an instruction was miss-predicted and the result is simply that a rewind occurs. In this embodiment, the faulting entry in the TLB is kept. If the instruction was correctly speculatively executed, then at step 355 it is determined whether or not the TLB 120 contains a faulting entry for the virtual address that was accessed. If not, then the flow proceeds to step 370 where the process ends. This represents the situation in which an instruction was correctly speculatively executed in which the TLB contains a valid correspondence between the virtual address and the physical address. If, however, a faulting entry is stored, then at step 360, the faulting entry in the TLB is invalidated, an example of which was shown with regards to FIG. 3C. A further page walk occurs at step 365 and the process ends at step 370. If the page walk is unsuccessful and results in a further translation error, then the CPU 110 is signaled accordingly. Additionally, in this embodiment, if the further translation error occurs then the faulting entry is re-added to the TLB 120 so that subsequent instructions that reference the some virtual address do not cause repeated page walks to occur.

Otherwise, a valid translation is stored in the TLB 120. This final scenario represents the situation in which the speculative execution of an instruction would results in a translation error and, on determining that the instruction was correctly speculatively executed, the page walk is carried out. Effectively, a page walk that results in a fault is delayed until such time as it can be determined whether or not the instruction was correctly speculatively executed. Note that, in the flow chart shown in FIG. 4, the steps refer to the execution of a specific single instruction. Other instructions can be executed in parallel or substantially in parallel via techniques such as pipelining. Accordingly, step 370 refers to the end of the process in respect of a specific instruction.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

I claim:

1. A data processing apparatus comprising:
processing circuitry to speculatively execute an instruction referencing a virtual address;

lookup circuitry to receive the virtual address from the processing circuitry, the lookup circuitry comprising:
storage circuitry to store at least one virtual address; and
page walking circuitry to perform a page walk on further storage circuitry, and in response to the virtual address being unlisted by the storage circuitry, to determine whether a correspondence between a physical address and the virtual address exists, wherein
the lookup circuitry signals an error when the correspondence cannot be found; and
in response to the error being signalled, the storage circuitry is configured to store an entry comprising the virtual address.

2. A data processing apparatus according to claim 1, wherein
in response to the correspondence being found by the page walking circuitry, the storage circuitry is configured to store an entry comprising the virtual address and the physical address; and
in response to the lookup circuitry receiving the virtual address when the storage circuitry comprises an entry comprising the virtual address and the physical address, the lookup circuitry is configured to provide the physical address to the processing circuitry.

3. A data processing apparatus according to claim 1, wherein
in response to the error being signalled, the storage circuitry is configured to store an entry comprising the virtual address and a fault indication to indicate the entry was made in response to the error being signalled.

4. A data processing apparatus according to claim 3, wherein
the processing circuitry is configured to issue a speculation signal to control circuitry to indicate whether or not the instruction was correctly speculatively executed.

5. A data processing apparatus according to claim 4, wherein
in response to the speculation signal indicating that the instruction was correctly speculatively executed and the storage circuitry having an entry comprising the virtual address and the fault indication, the entry is removed from the storage circuitry and the page walk circuitry performs the page walk again; and
the lookup circuitry is configured to signal a further translation error to the processing circuitry when the correspondence cannot be found again.

6. A data processing apparatus according to claim 5, wherein
in response to the lookup circuitry signalling the further translation error, the storage circuitry is configured to add an entry comprising the virtual address and the fault indication.

7. A data processing apparatus according to claim 4, wherein
in response to the speculation signal indicating that the instruction was incorrectly speculatively executed, the page walk is allowed to complete before the instruction is rewound; and
in response to the error being signalled, the storage circuitry is configured to store an entry comprising the virtual address.

8. A data processing apparatus according to claim 4, wherein in response to the speculation signal indicating that the instruction was incorrectly speculatively executed, the page walk is terminated.

9. A data processing apparatus according to claim 1, wherein
the lookup circuitry comprises a translation lookaside buffer.

10. A data processing apparatus according to claim 1, wherein
the further storage circuitry is a memory device.

11. A data processing apparatus according to claim 1, wherein
the entry comprises one or more attributes.

12. A method of operating a data processing apparatus, the method comprising the steps:
speculatively executing an instruction referencing a virtual address;
checking a storage circuitry for the virtual address;
performing a page walk on further storage circuitry;
in response to the virtual address being unlisted by the storage circuitry, determining whether a correspondence between a physical address and the virtual address exists, wherein
an error is signalled when the correspondence cannot be found; and
in response to the error being signalled, the storage circuitry stores an entry comprising the virtual address.

13. A data processing apparatus, comprising:
means for speculatively executing an instruction referencing a virtual address;
means for checking a storage means to determine whether the virtual address is listed;
means for performing a page walk on further storage circuitry, and in response to the virtual address being unlisted by the storage circuitry, to determine whether a correspondence between a physical address and the virtual address exists, wherein
an error is signalled when the correspondence cannot be found; and
in response to the error being signalled, the storage means stores an entry comprising the virtual address.

14. A data processing apparatus according to claim 1, wherein:
in response to the error being signalled, the storage circuitry is configured to store a faulting entry comprising the virtual address, and
when the processing circuitry subsequently speculatively executes the instruction referencing the virtual address, the lookup circuitry is configured to receive the virtual address from the processing circuitry, detect the faulting entry comprising the virtual address in the storage circuitry, and prevent the page walking circuitry from performing a page walk on the further storage circuitry for the virtual address.

15. A method according to claim 12, wherein:
in response to the error being signalled, the storage circuitry stores a faulting entry comprising the virtual address, and
when subsequently speculatively executing the instruction referencing the virtual address, detecting the faulting entry comprising the virtual address in the storage circuitry and preventing a page walk on the further storage circuitry for the virtual address.

16. A data processing apparatus according to claim 13, wherein:

in response to the error being signalled, the storage means is configured to store a faulting entry comprising the virtual address, and when the means for speculatively executing subsequently speculatively executes the instruction referencing the virtual address, the means for checking is configured to receive the virtual address from the means for speculatively executing circuitry, detect the faulting entry comprising the virtual address in the storage means, and prevent the means for performing a page walk from performing a page walk on the further storage circuitry for the virtual address.

* * * * *